United States Patent
Gurich et al.

(10) Patent No.: US 7,420,362 B2
(45) Date of Patent: *Sep. 2, 2008

(54) SENSOR ARRAY FOR DETECTING THE MOVEMENT OF A POSITIONING ELEMENT MOVED BACK AND FORTH USING AN ACTUATOR

(75) Inventors: Gunter Gurich, Aachen (DE); Hermann-Josef Laumen, Heinsberg (DE); Ralf Weber, Wurselen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/573,930

(22) PCT Filed: Sep. 30, 2005

(86) PCT No.: PCT/EP2003/010823

§ 371 (c)(1),
(2), (4) Date: Jan. 10, 2007

(87) PCT Pub. No.: WO2005/042969

PCT Pub. Date: May 12, 2005

(65) Prior Publication Data

US 2007/0152659 A1    Jul. 5, 2007

(51) Int. Cl.
*G01B 7/14* (2006.01)
*G01B 7/30* (2006.01)
(52) U.S. Cl. ............................. 324/207.24; 324/207.19
(58) Field of Classification Search ............ 324/207.24, 324/207.19
See application file for complete search history.

(56) References Cited

U.S. PATENT DOCUMENTS 4,717,874 A    1/1988   Ichikawa et al.

(Continued)

FOREIGN PATENT DOCUMENTS

DE    3127164 A1    4/1982

(Continued)

*Primary Examiner*—Reena Aurora
(74) *Attorney, Agent, or Firm*—Gifford, Krass, Sprinkle, Anderson, & Citkowski, P.C.

(57) ABSTRACT

The invention relates to a sensor array for detecting travel of a movable member, especially a positioning element that is movable using an actuator. Said sensor array comprises a stationary coil arrangement (18) that is provided with an active coil (18.1) and at least one passive coil (26.1, 26.2) located a distance therefrom. The coil arrangement (18) is connected to a power supply unit (30) and a signal-detecting device (29). The inventive sensor array further comprises an axially movable rod-shaped sensor part (17) that is made of a preferably magnetizable material, is connected to the positioning element which is movable fore and aft in an axial direction, and is provided with at least one short circuit element (23, 23.0). Said at least one short circuit element (23, 23.0) is made of an electrically conducting material having low ohmic resistance, is delimited by a final edge (23.1, 23.2) in the longitudinal direction, respectively, and has a dimension in the direction of movement, which is calculated such that one final edge (23.1, 23.2, 23.3) of the at least one short circuit element (23) is enclosed by the active coil (18.1) in at least one final position (I, II) defined by the predefined length of stroke (h) while another final edge (23.1, 23.2, 23.3) of the at least one short circuit element (23, 23.0) is at least partly embraced by one of the at least one passive coils (26.1, 26.2).

15 Claims, 7 Drawing Sheets

U.S. PATENT DOCUMENTS 7,053,604 B2 * 5/2006 Laumen et al. ........ 324/207.19

FOREIGN PATENT DOCUMENTS

| | | | |
|---|---|---|---|
| DE | 10157119 A | 6/2002 |
| DE | 10157120 A | 6/2002 |
| EP | 0170723 A2 | 2/1986 |
| GB | 754917 A | 8/1958 |

* cited by examiner

SENSOR ARRAY FOR DETECTING THE MOVEMENT OF A POSITIONING ELEMENT MOVED BACK AND FORTH USING AN ACTUATOR

BACKGROUND OF THE INVENTION

In an actuator for moving a positioning element back and forth, particularly an electromagnetic actuator, the movement of the actuator armature is typically identical to the movement of the positioning element to be actuated, such that it is possible to measure the armature movement and consequently the movement of the positioning element in the region of the actuator.

In an electromagnetic actuator with two spaced-apart electromagnets, the pole faces of which point toward one another and between which an armature is guided such that it can be moved back and forth against the force of return springs when the electromagnets are alternately supplied with a current, a measurement of the current and/or voltage at the respective attracting magnet and during release of the restraining magnet makes it possible to draw conclusions about the armature movement that can subsequently be used for control purposes if the signals are processed appropriately.

An electromagnetic actuator of this type is used, for example, as a fully variable valve drive for actuating a gas exchange valve of a reciprocating internal combustion engine. In view of stricter requirements regarding control accuracy, particularly with respect to influencing the impact velocity of the armature on the pole face of the respective attracting magnet and therefore also the touch-down speed of the gas exchange valve on the valve seat, a measurement of movements derived from the current and voltage curves at the coils of the electromagnets no longer appears sufficient because the signals obtained therefrom can only be used for the subsequent engine cycle.

Consequently, it is necessary to measure the movement of the armature and therefore the movement of the positioning element "online" over the entire length of stroke with the aid of a corresponding sensor assembly, such that the power supply of the electromagnets can be influenced by appropriately controlling the actuator, for example, an electromagnetic actuator, based on corresponding signals while the actuator moves the positioning element. This makes it possible to control armature movement in the current engine cycle.

This requirement can only be fulfilled with a displacement sensor with a low error deviation that generates a corresponding signal during the entire stroke, i.e., a sensor that "reproduces" the stroke. Due to the requirements with respect to resolution and accuracy of gas exchange valves, as well as of injection nozzles and needle valves, associated with the relatively short strokes, the sensor assembly needs to be largely protected from interference. This also applies to other instances in which the movement of a reciprocating component, for example, a piston valve or the like, needs to be measured in a highly accurate fashion. In this case, the displacement signal being generated should be as linear as possible.

A sensor of this type is known, in principle, from DE 101 57 119 A, wherein this sensor requires, however, a relatively long structural length if accurate measurement signals are to be obtained.

SUMMARY OF THE INVENTION

The invention is based on the objective of developing a sensor assembly that is equivalent to the previously known sensor assembly, but has a substantially shorter structural length and generates an essentially linear displacement signal.

According to the invention, this objective is attained with a sensor assembly with the characteristics of claim 1, namely a sensor assembly for detecting travel of a movable member, particularly a positioning element that is moved by an actuator, wherein said sensor assembly features a stationary coil arrangement with an active coil and at least one passive coil arranged at a distance therefrom, wherein said coil arrangement is connected to a power supply unit and a signal acquisition device, wherein the sensor assembly also features an axially movable rod-shaped sensor part that is preferably manufactured from a magnetizable material and is connected to a positioning element that can be moved axially back and forth, wherein said rod-shaped sensor part is provided with at least one short-circuit element that is manufactured from an electrically conductive material with a low ohmic resistance and is respectively delimited by a final edge in the longitudinal direction, and wherein said short-circuit element has a dimension relative to the direction such of movement that one final edge of the at least one short-circuit element is enclosed by the active coil and another final edge of the at least one short-circuit element is at least partially encompassed by one of the at least one passive coils in at least one of the final positions I, II defined by the given length of stroke h.

The signal generation described in greater detail below is respectively achieved by means of a field variation in at least two coils that is realized by changing the length of penetration of at least one short-circuit element, arranged on the rod-shaped sensor part, into the active coil, wherein this length of penetration changes with the stroke. The particular advantage of the inventive solution can be seen in that the end region of the at least one short-circuit element is still covered by one of the two coils when the final position defined by the given length of stroke is reached. The otherwise passive second coil is then activated in this region. The "geometry" of the active coil and the at least one passive coil, i.e., their length, their distance from one another and the length of the short-circuit element, is chosen such that a transition from the material of the short-circuit element to the preferably ferromagnetic material of the rod-shaped sensor part, i.e., a final edge of the short-circuit element, always penetrates into at least one of the otherwise passive coils when the material transition defined by the other final edge of the short-circuit element approaches one end of the active coil. This already makes it possible to linearize the generated measuring signal. An additional third material transition between the different materials, particularly an additional short-circuit element, makes it possible to achieve a linearization of the output signal over practically the entire length of the stroke if the lengths of the zones of superior electric conductivity that are defined by the length of the short-circuit elements, as well as the distance between the two short-circuit elements and the thus-defined length of the zone of ferromagnetic material, are adapted appropriately with respect to the length of the coils.

It is expedient if the length of the active coil is greater than the length of stroke h to be measured.

In the utilization of electromagnetic actuators for actuating gas exchange valves of a reciprocating internal combustion engine, this interconnection can be realized such that one non-actuated and one actuated gas exchange valve are respectively interconnected in the half bridge.

One particularly advantageous embodiment of the invention can be realized by arranging two short-circuit elements that are respectively delimited by final edges on the rod-shaped sensor part such that they are spaced apart from one another, and by choosing the distance between the facing ends of the at least two coils as well as the distance between the facing final edges of the short-circuit elements such that one final edge of the at least one short-circuit element is enclosed by the active coil and another final edge of the at least one short-circuit element is at least partially encompassed by one of the at least one passive coils in at least one of the final positions I, II defined by the given length of stroke h.

The linearity can be additionally improved with technical winding measures, for example, by purposefully irregular winding, additional compensation winding, or similar measures. When providing two passive coils, one of which is respectively associated with each end of the active coils, these passive coils are preferably wound in the same direction and are connected to one another in series, wherein these passive coils are realized in the form of quarter bridge elements and interconnected with the active coil such that a half bridge is formed.

When the coil arrangement of such a sensor assembly is acted upon by a high-frequency alternating current, a high-frequency magnetic field is produced that acts upon the short-circuit element connected to the rod-shaped sensor part and generates eddy currents in the short-circuit element. The eddy currents in turn produce an opposing magnetic field that counteracts the high-frequency magnetic field, causing this opposing field in the form of a field displacement. The thus-caused field variation of the coil manifests itself externally in the form of an inductance change. If the rod-shaped sensor part with its opposing field is now moved relative to the coil arrangement, the displacement of the sensor part and therefore the displacement of the positioning element can be measured in a contactless fashion with the aid of a corresponding evaluation circuit based on the inductance chance caused by the field variation. The rod-shaped sensor part preferably consists of a magnetically permeable or magnetically conductive material. The short-circuit element may be realized in the form of a short-circuit ring attached to the rod-shaped sensor part. Instead of realizing the short-circuit element in the form of a short-circuit ring, the rod-shaped sensor part of magnetizable material may also be divided and fitted with a rod-shaped intermediate piece of electrically conductive material that is fixedly connected thereto.

In order to minimize the effect of external interfering influences, a housing is provided that largely encloses the coil arrangement and consists of a magnetically conductive material that, however, has an inferior electric conductivity. This is particularly important if the sensor assembly is directly connected to the actuator and the actuator is realized in the form of an electromagnetic actuator, namely because in this case corresponding noise fields are produced by operation of the electromagnets of the actuator. The coil arrangement is shielded from these noise fields by the housing.

Although it would be possible, in principle, to apply the material of a ring-shaped short-circuit element to the rod-shaped sensor part in the form of a thin layer by means of vapor deposition, it is expedient for the short-circuit element in the form of a short-circuit ring to have a distinct wall thickness that preferably lies between 0.1 and 0.5 mm. This can be realized, for example, by machining a groove of corresponding depth into the ferromagnetic sensor part, wherein the width of the groove corresponds to the length of the respective short-circuit element, and the groove is subsequently electroplated with copper. A corresponding adaptation of the wall thickness of the short-circuit element makes it possible to compensate a certain temperature dependence of the sensor assembly in this case.

This is particularly important in sensor assemblies that are used in connection with actuators subjected to changing operating temperatures, for example, actuators for actuating gas exchange valves of reciprocating internal combustion engines. Copper or even aluminum is preferably used as the material for the short-circuit element, wherein this results in the specific resistance of the material of the short-circuit element increasing with the temperature at a given voltage, as well as in the intensities of the opposing magnetic field and the resulting magnetic field respectively decreasing and increasing accordingly.

On the other hand, the high-frequency magnetic field of the coil arrangement acting upon the short-circuit element causes a skin-effect for the electric currents induced in the short-circuit element, i.e., the eddy currents only flow in a thin layer in the outer wall region of the short-circuit ring. Although the specific electric resistance of the short-circuit ring increases with the temperature, the eddy currents penetrate somewhat deeper into the material of the short-circuit ring in this case such that the temperature-related increase in specific electric resistance is largely compensated by a correspondingly increased conductor cross section. At a limited thickness of the short-circuit element, particularly at a limited wall thickness of the short-circuit ring, the penetration of the eddy currents is limited as the temperature increases such that the eddy currents decrease above a certain temperature. The temperature response of the sensor consequently can be influenced by the thickness of the short-circuit ring. A suitable choice of the wall thickness therefore makes it possible to partially compensate other temperature-related influences, for example, the temperature dependence of the permeability of the magnetic core and cladding material.

In another embodiment of the invention, a carrier frequency measuring bridge provided for power supply and signal acquisition purposes features a frequency generator, wherein both coils of the coil arrangement form part of the measuring bridge. In this case, it is expedient for the frequency generator to generate a high carrier frequency, for example, on the order of 100 kHz.

BRIEF DESCRIPTION OF THE DRAWING

Other embodiments and advantages of the invention are disclosed in the following description and illustrated in the figures.

The invention is described in greater detail below with reference to the schematic embodiments illustrated in the figures. The figures show.

DETAILED DESCRIPTION OF THE INVENTION

Figure 1:
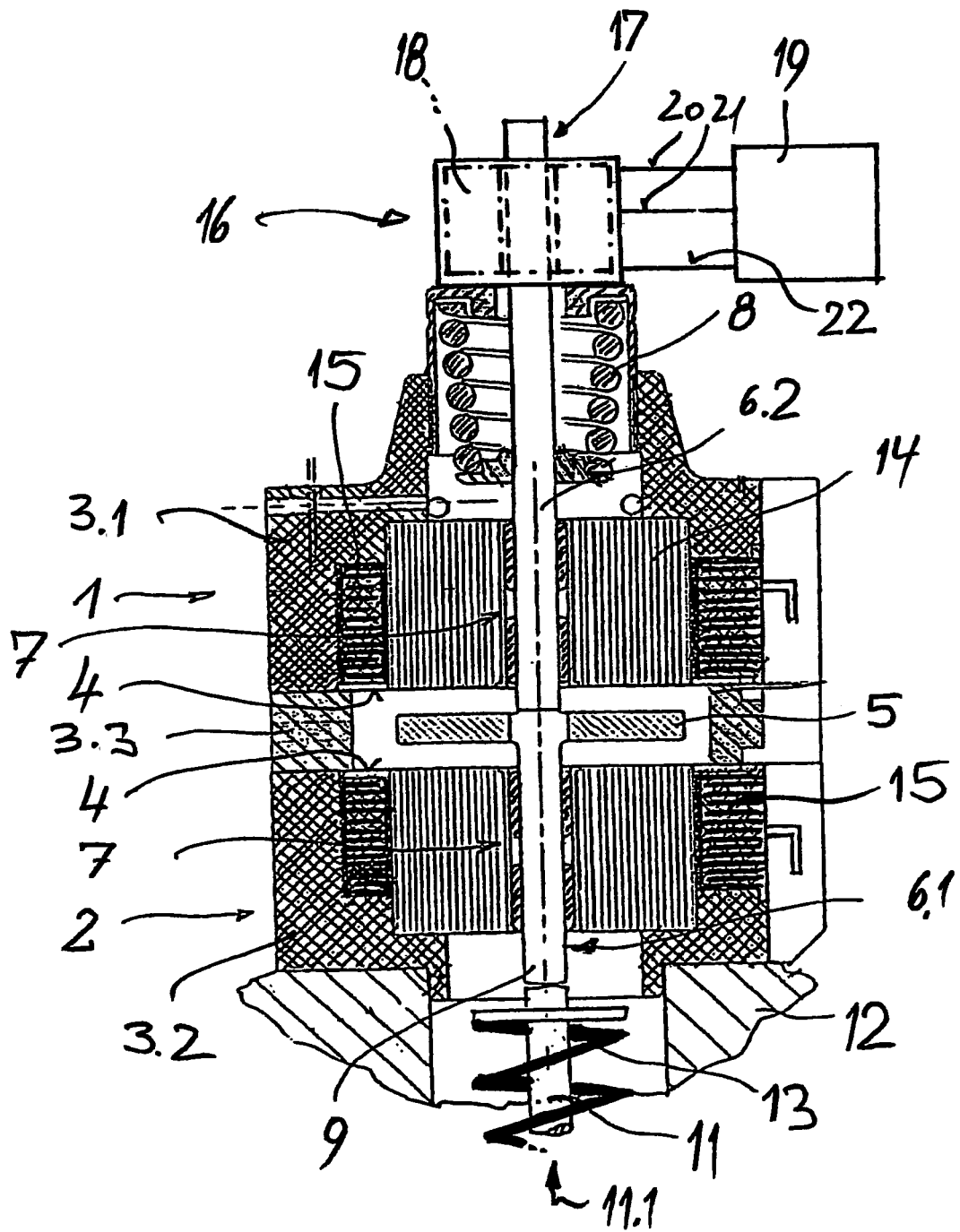
FIG. 1, an electromagnetic actuator for actuating a gas exchange valve.

The electromagnetic actuator shown in FIG. 1 is essentially formed by two electromagnets 1 and 2 that are enclosed by two housing parts 3.1 and 3.27 wherein these two housing parts are spaced apart from one another by means of a housing part 3.3 in the form of a spacer, and are positioned such that their pole faces 4 point toward one another. An armature 5 is arranged in the space enclosed by the spacer 3.3 between the two poles faces 4, and is guided in a guide 7 by means of a guide pin 6.1 such that it can be moved back and forth.

The armature 5 is connected to a return spring 8 by means of a guide pin 6.2 that is supported on the guide pin 6.1 in the region of the armature 5. The lower free end 9 of the guide pin 6.1 is supported on the positioning element, in this case, for example, on the free end of the shaft 11 of a gas exchange valve that is guided in the schematically indicated cylinder head 12 of a reciprocating internal combustion engine. A return spring 13 acts upon the gas exchange valve in the closing direction (arrow 11.1), wherein the return spring 13 and the return spring 8 act in opposite directions such that the armature 5 assumes an idle position between the two pole faces 4 of the two electromagnets 1 and 2, as shown in FIG. 1, when the electromagnets are in the currentless state.

The housing parts 3.1 and 3.2 of the two electromagnets respectively enclose a preferably cuboid yoke member 14, wherein these yoke members are provided with recesses into which an annularly designed coil 15 is inserted. The respective coils can be alternately supplied with a current by means of a control unit, not illustrated in greater detail, for opening and closing the gas exchange valve.

A sensor assembly 16 arranged on the opposite end of the actuator relative to the gas exchange valve essentially consists of a rod-shaped sensor part 17, for example, a so-called measuring stilt that for practical purposes represents an extension of the spring bolt 6.2. The rod-shaped sensor part 17 is enclosed by a coil arrangement 18 that is connected to a voltage supply and signal acquisition device 19. During operation, the back and forth movement of the rod-shaped sensor part 17 in the coil arrangement 18 generates an alternating current or an a.c. voltage that is proportional to the displacement of the sensor part, and therefore proportional to tile displacement of the armature 5 and therefore proportional to the displacement of the positioning element depending on the circuit arrangement and the design of tile sensor. A direct tap makes it possible to obtain the armature displacement in the form of a signal, and a speed-proportional signal can be obtained by differentiation of the displacement signal.

Figure 2:
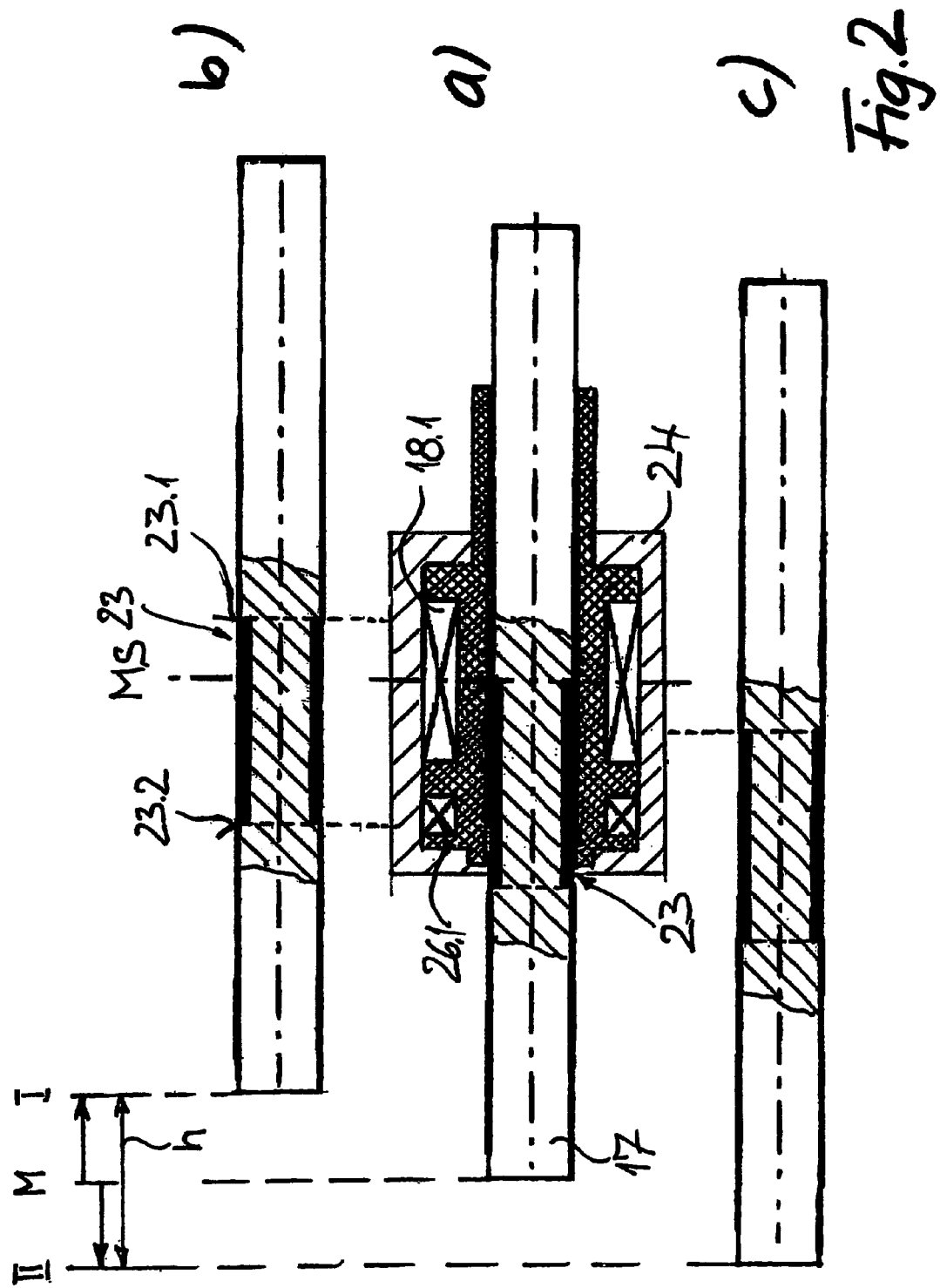
FIGS. 2a), b), c), an enlarged section through a basic variation of a sensor assembly with a short-circuit ring and two coils, in different operating positions.

FIG. 2 schematically shows a basic variation of the sensor assembly. In this case, FIG. 2a shows the design of the sensor while FIG. 2b and FIG. 2c show the possible final positions of the rod-shaped sensor part for the length of stroke h.

According to FIG. 2a), the sensor assembly essentially consists of the rod-shaped sensor part 17 that is encompassed by the coil arrangement 18 connected to the voltage supply and evaluation device 19 (FIG. 1) via corresponding leads 20, 21, 22. In the embodiment shown, the coil arrangement features a long active coil 18.1 and a short passive coil 26.1 that are wound on a coil support 27.

The rod-shaped sensor part 17 shown is connected to the positioning element and is provided with a short-circuit element 23 in the form of a ring or sleeve of an electrically conductive material with low ohmic resistance, namely a so-called short-circuit ring. The short-circuit ring 23 has two final edges 23.1 and 23.2. Its length relative to the direction of movement is chosen such that the end region delimited by one final edge, in this case the final edge 23.1, is enclosed by the central region MS of the active coil 18.1 while the passive coil 26.1 is fully penetrated by the short-circuit ring in the central position M of the stroke h shown in FIG. 2a).

Once the sensor part 17 reaches the final position I shown in FIG. 2b), the active coil 18.1 is effectively almost completely penetrated by the short-circuit ring 23, while the passive coil 26.1 is partially penetrated by the adjacent ferromagnetic material. Due to the fact that the essentially passive coil 26.1 encloses the final edge 23.2 of the short-circuit element 23 in the vicinity of the final position I, the coil 26.1 also becomes active near the final position and contributes to the linearization of the output signal in the bridge circuit according to FIG. 4.

Once the rod-shaped sensor part 17 reaches the final position II according to FIG. 2c) during the return movement, the final edge 23.1 approaches the end of the active coil 18.1 while the short-circuit ring 23 is still surrounded by the passive coil 26.1, and the active coil 18.1 is effectively almost completely filled with the magnetically conductive material of the rod-shaped sensor part. A linearization of the output signal does not take place in this final position.

With the exception of corresponding through-openings for the rod-shaped sensor part 17, the coil arrangement 18 may be enclosed by the housing 24 on all sides. In this case, the housing 24 consists of a material with superior magnetic conductivity but inferior electric conductivity, and serves to shield the coil arrangement 18 from the influence of external magnetic fields. The coils can be fixed in the housing 24, for example, with a pourable sealing compound. This also applies to the embodiments described below.

The short-circuit ring 23 of a material with superior electric conductivity, preferably copper or aluminum, has a thickness that lies, for example, between 0.1 and 0.5 mm. In the embodiment shown, the short-circuit ring 23 is inserted into a groove 23.3 in the rod-shaped sensor part 17. The rod-shaped sensor part 17 can be directly formed by the positioning element to be actuated, for example, an injector needle of a fuel injector or the shaft of a gas exchange valve, such that the rod-shaped sensor part 17 penetrates the coil arrangement with its entire length, or by a corresponding bolt of the actuator armature or a measuring stilt connected thereto.

A sensor assembly of this type operates in accordance with the eddy current principle. When a high-frequency alternating current acts on the coil arrangement 18 such that a high-frequency magnetic field is produced, electrical potential differences are induced in the short-circuit ring 23 that are transformed into eddy currents by the short-circuit. These eddy currents in turn produce an opposing magnetic field that counteracts the high-frequency magnetic field of the coil arrangement 18, causing the opposing field in the form of a field variation. During a movement of the rod-shaped sensor part 17, the direction and the displacement of the field variation relative to the coil arrangement manifest themselves externally in the form of a change in inductance that is dependent on the movement of the rod-shaped sensor part 17. Consequently, this makes it possible to measure the position and therefore the displacement of the sensor part 17 by means of a corresponding signal.

Figure 3:
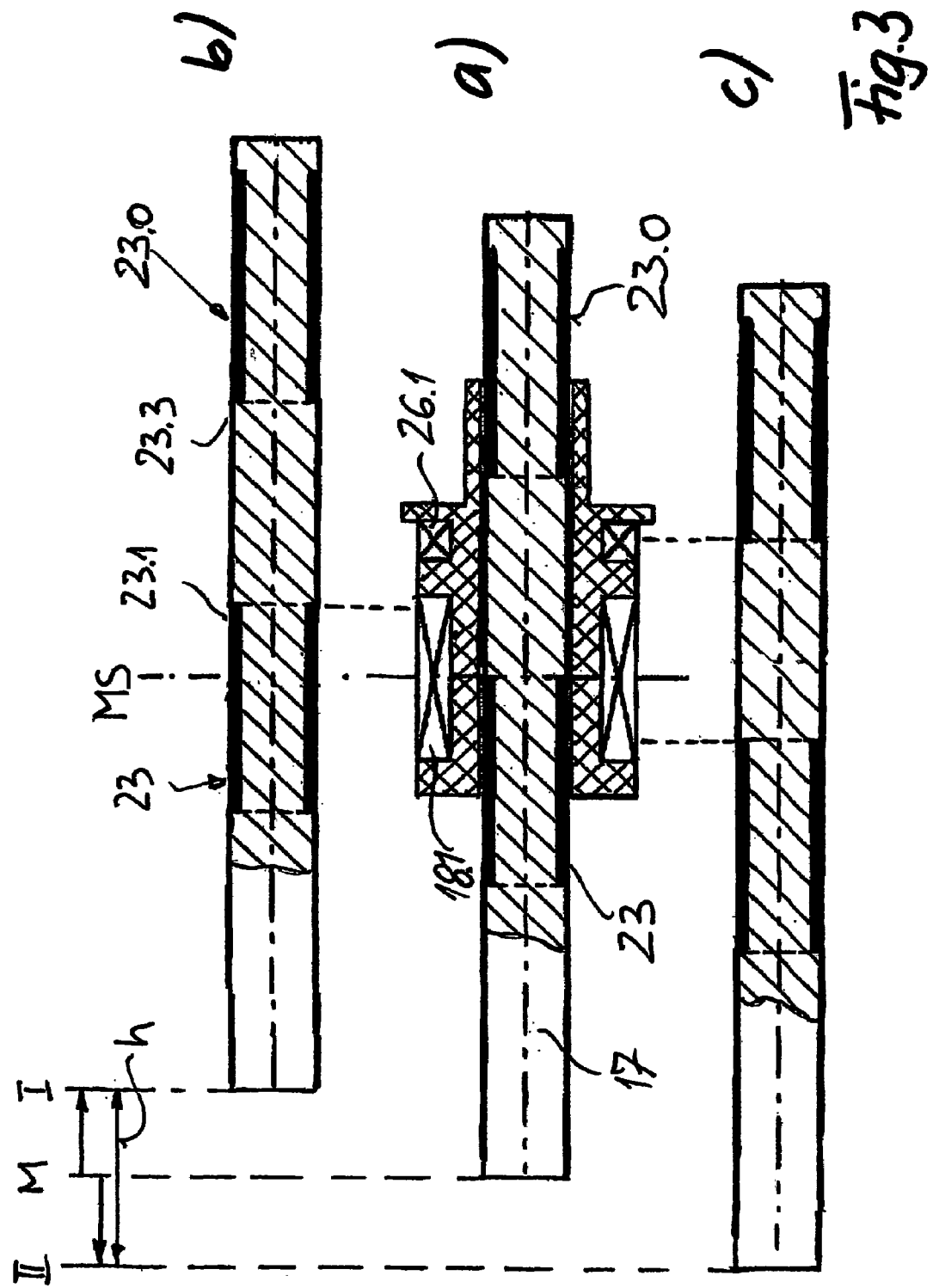
FIGS. 3a), b), c), a modification of the embodiment according to FIG. 2 with two short-circuit rings and two coils, in different operating positions.

FIG. 3 shows a preferred embodiment of the sensor assembly in different operating positions, wherein this sensor assembly is illustrated in analogous fashion to that described with reference to FIG. 2. Since identical components are identified by the same reference symbols, we refer to the preceding description in this respect. The coil arrangement 18 also features a long active coil 18.1 and a short passive coil 26.1 in this embodiment. The difference in comparison with the embodiment according to FIG. 2 lies in the fact that the rod-shaped sensor part 17 is provided with two short-circuit rings, namely a first short-circuit ring 23 and a second short-circuit ring 23.0. The two short-circuit rings 23 and 23.0 are arranged on the rod-shaped sensor part 17 at a distance from one another. The distance between the final edge 23.1 of the short-circuit ring 23 and the final edge 23.3 of the short-circuit ring 23.0 is once again adapted to the dimensions of the coil arrangement 18. Based on the central position M shown in FIG. 3a), the final edge 23.1 of the short-circuit ring 23 is enclosed by the central region MS of the active coil 18.1 while the passive coil 26.1 is still penetrated by the ferromagnetic material of the sensor part 17.

Once the sensor part 17 reaches the final position I shown in FIG. 3b), the active coil 18.1 is effectively almost completely penetrated by the short-circuit ring 23 while the passive coil 26.1 is still penetrated by the ferromagnetic material of the sensor part 17 only.

Once the sensor part 17 reaches the final position 11 shown in FIG. 3c, the active coil 18.1 is effectively almost completely penetrated by the ferromagnetic material of the sensor part 17 while the region delimited by the final edge 23.3 of the second short-circuit ring 23.0 penetrates and therefore activates the thus far passive coil 26.1.

Figure 4:
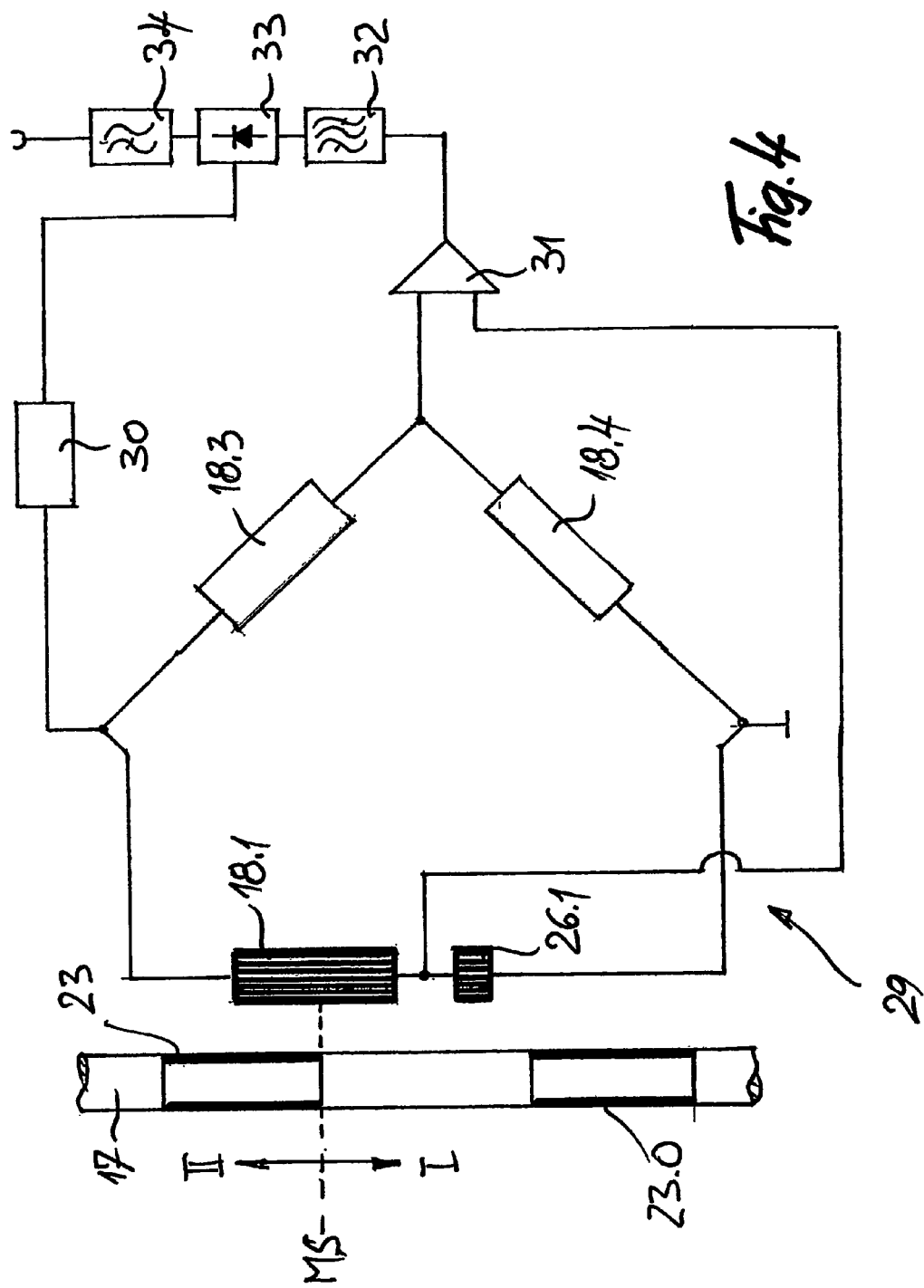
FIG. 4, a circuit arrangement for the embodiment according to FIG. 3.

FIG. 4 schematically shows a circuit for the acquisition of measurement signals, in the form of the carrier frequency measuring bridge, for the embodiments according to FIG. 2 or 3. The coil 18.1 and the coil 26.1 of the coil arrangement 18 of the sensor assembly are interconnected with two additional impedances, for example, coils 18.3 and 18.4, such that a carrier frequency measuring bridge 29 is formed. The measuring bridge 29 is supplied with a high-frequency alternating current by means of a frequency generator 30.

A field variation occurs if the respective active rod-shaped sensor part 17, with its short-circuit rings 23 and 23.0, is now moved relative to the coils 18.1 and 26.1 of the bridge 29 in the direction of the final position I. This causes a "detuning" of the bridge 29 that can be measured with an amplifier 31 and a band-pass filter 32. A stroke-dependent signal can be obtained with the aid of a rectifier 33, which can be realized in a phase-selective fashion, and a low-pass filter 34, wherein the stroke-dependent signal can subsequently be processed for control purposes, for example, in order to control the gas exchange valves. The passive coil 26.1 acts as a compensation coil in this case. If the sensor part 17 is moved in the direction of the final position II, the coil 18.1 becomes passive in the final position II while the passive coil 26.1 becomes active, and thus counteracts the non-linear signal increase.

Figure 5:
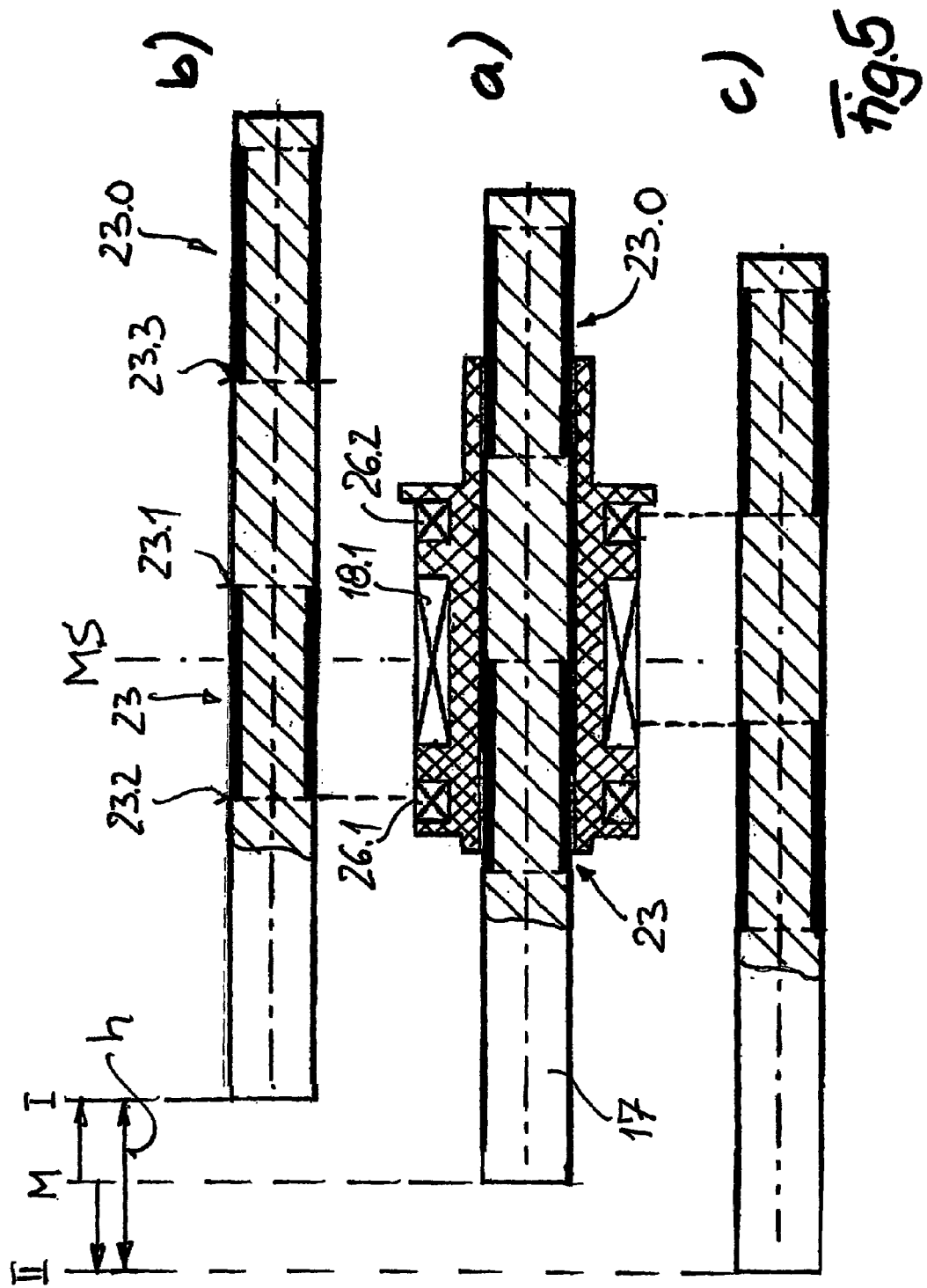
FIGS. 5a), b), c), a modification of the embodiment according to FIG. 3 with two short-circuit elements and three coils, in different operating positions, FIG. 6, a circuit arrangement for the embodiment according to FIG. 5.
Figure 6:
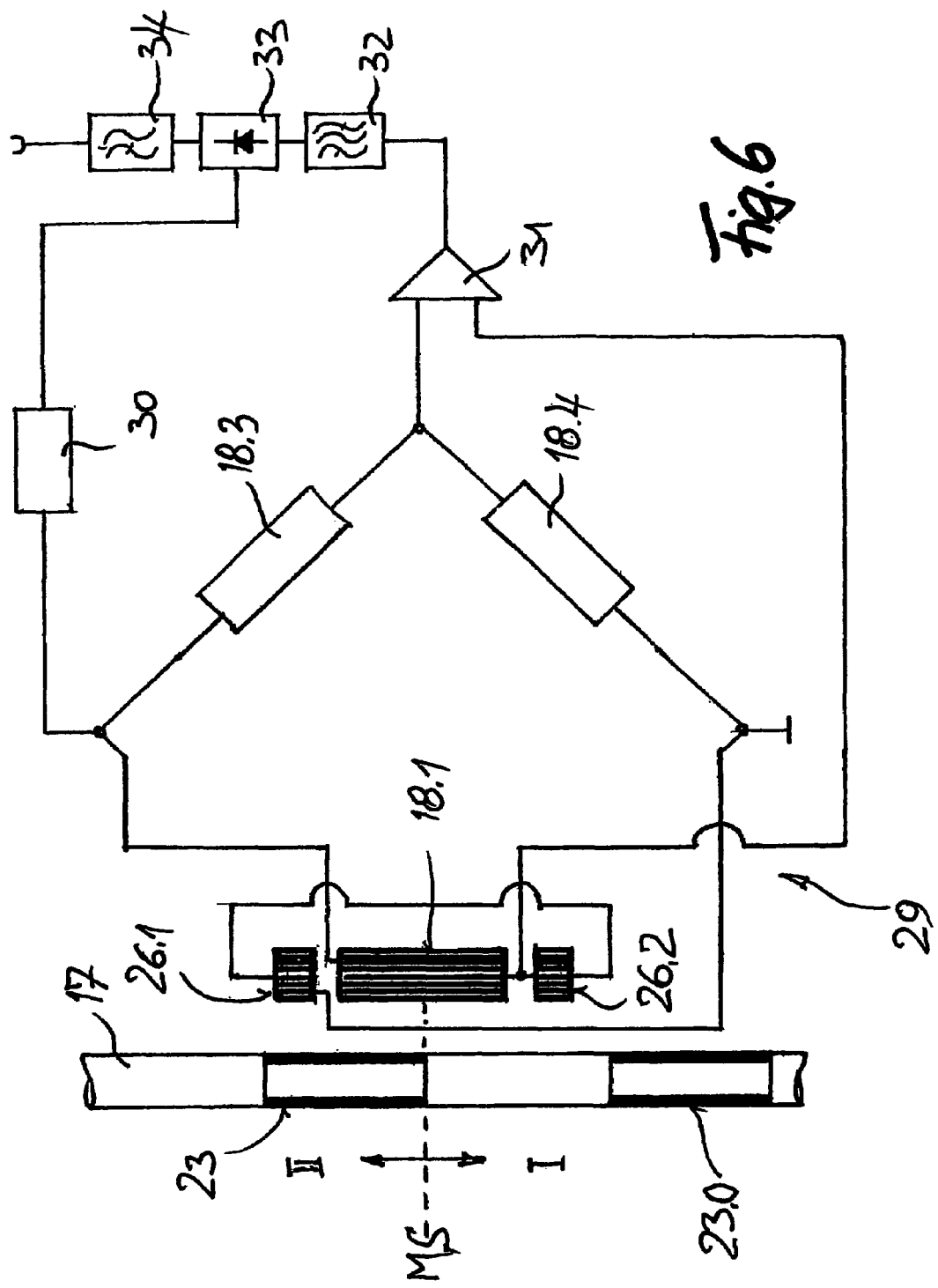

FIG. 5 shows a variation of the embodiment according to FIG. 3, in which two short passive coils 26.1 and 26.2 are respectively arranged on either side of a long active coil 18.1. Since the corresponding circuit arrangement according to FIG. 6 essentially corresponds to the circuit shown in FIG. 4, we refer to the description of FIG. 4 in this respect. The two coils 26.1 and 26.2 are connected in series in this case. The inductance of the active coil 18.1 approximately corresponds to the sum of those of both passive coils 26.1 and 26.2. The two passive coils 26.1 and 26.2 are electrically connected in series and form one-quarter of the carrier frequency bridge 29.

The distance between the two short-circuit rings 23 and 23.0, as well as the length of both short-circuit rings 23 and 23.0 relative to the coil arrangement shown, are chosen such that in the central position of the final edge 23.1 of the short-circuit ring 23, said edge lies in the central region MS of the coil 18.1 and coil 26.1 still completely encloses the short-circuit ring 23 while the coil 26.2 is fully penetrated by the ferromagnetic material of the sensor part 17, and the short-circuit ring 23.0 therefore lies outside the area of influence of coil 26.2.

According to FIG. 5b), the short-circuit ring 23 is effectively almost completely enclosed by the coil 18.1 in the final position I while the passive coil 26.1 is partially penetrated by the adjacent ferromagnetic material of the sensor part 17 and the passive coil 26.2 is completely penetrated.

If the sensor part 17 is displaced into the final position II shown in FIG. 5c), the final edge 23.3 of the short-circuit ring 23.0 reaches the region in which it is overlapped by the coil 26.1 while the short-circuit ring 23 overlaps the area of influence of the coil 26.2. The coil 18.1 is effectively almost completely penetrated by the ferromagnetic material of the sensor part 17 in this position.

Figure 7:
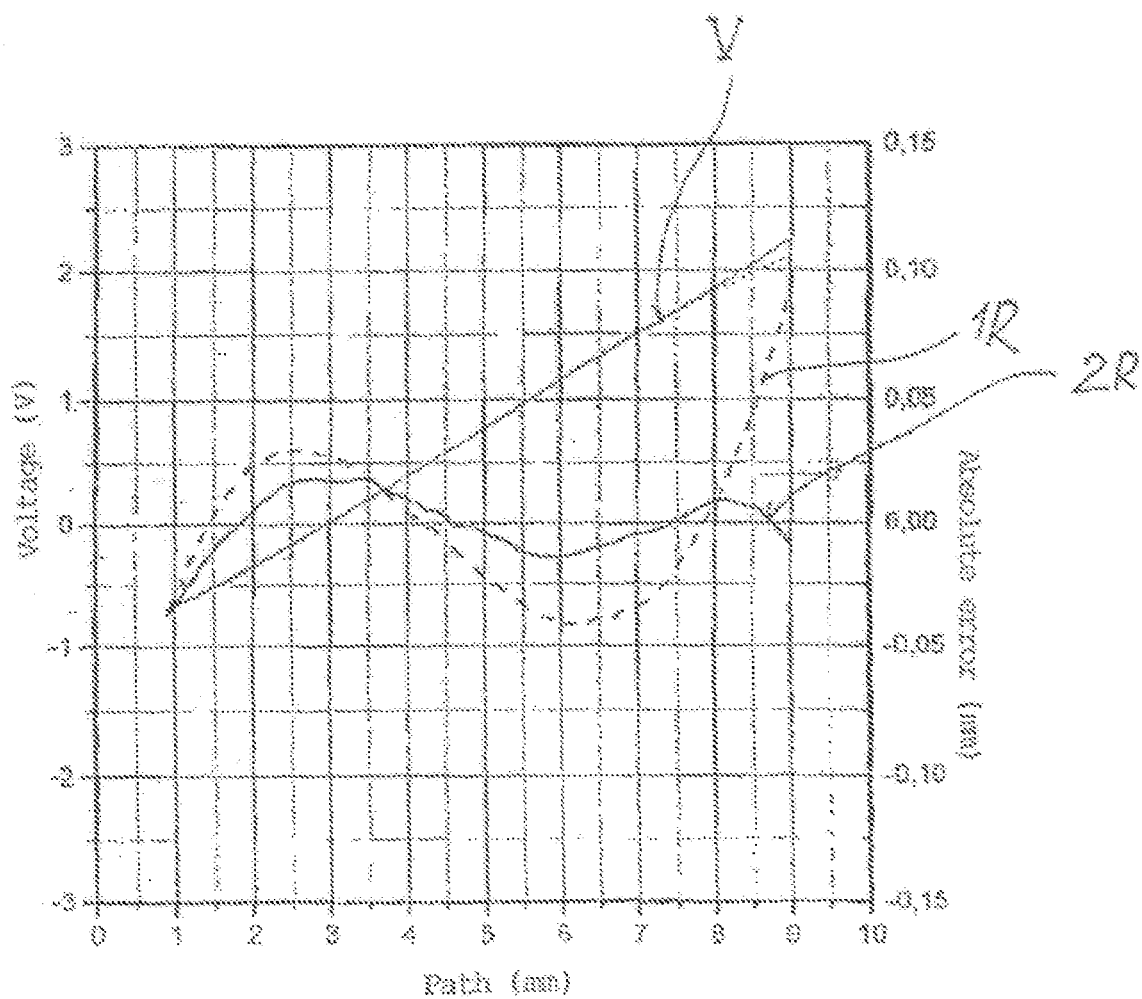
FIG. 7, a diagram in which the voltage is plotted as a function of the displacement, wherein the error deviation is also illustrated in this figure.

FIG. 7 shows a diagram in which the voltage V is plotted as a function of the length of stroke h. This figure also shows the resulting measurement errors of different systems in relation to the actual displacement.

The line V shows the voltage for a stroke of 8 mm. The broken line IR indicates the absolute measurement error for the embodiment according to FIG. 2 with only one short-circuit ring, in millimeters, while the continuous line 2R indicates the error deviation for an embodiment according to FIG. 5 with two short-circuit rings, a long active coil 18.1 and two short passive coils 26.1 and 26.2. According to this diagram, the embodiment according to FIG. 5 results in a significantly improved linearity of the measuring signal.

The invention claimed is:

1. Sensor arrangement for the collection of stroke data for a movable element, in particular by an actuator movable through a control member, said arrangement comprising an active coil (18.1) located a distance from at least one passive coil (26.1, 26.2) exhibiting coil arrangement (18); having a current supply (30); and a signal collector (29); and an axially movable rod-shaped sensor part (17) preferably formed from a magnetizable material, said rod-shaped sensor part axially moving back and forth the movable control member in connection therewith between end positions and having a long axis ending in a trailing edge (23.1, 23.2); wherein a short-circuit element (23, 23.0) is provided that is formed from an electrical-conductive material having a small Ohmic resistance, said short-circuit element extending so as to limit the direction of motion as defined by at least one of the given stroke-height (h) defined end position (I, II), and a trailing edge (23.1, 23.2, 23.3) wherein at least a short-circuit element (23) is enclosed by the active coil (18.1) and another trailing edge (23.1, 23.2, 23.3) of at least a short-circuit element (23, 23.0) is at least partly covered by at least one passive coil (26.1, 26.2) and the passive coil is activated upon reaching one of the end positions of a linear movement producing measuring signal.

2. The sensor arrangement according to claim 1, characterized by the trailing edge of the short-circuit element interfaces with a switch at an end of the active coil, wherein another end of the short-circuit element is the passive coil.

3. The sensor arrangement of claim 1, characterized by the rod shaped sensor part (17) having two marks in each case by trailing edges (23.1, 23.2) to limit the short circuit (23, 23.0) distance to between the two marks and such that the distance of each of two course-turned ends is limited to between two coils (18.1, 26.1) and the distance of the each other course-turned trailing edges (23.1, 23.2) of short-circuit elements (23, 23.0) is also limited to the given stroke-height (h) defined end position (I, II) of the sensor element (17) one of the trailing edges (23.1, 23.2, 23.3) of the short-circuit elements (23, 23.0) is enclosed by the active coil (18.1) and the other trailing edge (23.1, 23.2, 23.3) of at least the short-circuit element (23, 23.0) is at least partly covered by the at least one passive coil (26.1, 26.2).

4. The sensor arrangement according to claim 1, characterized by the active coil (18.1) having a longer length than the passive coil (26.1, 26.2) in the direction of the motion of the sensor part of (17).

5. The sensor arrangement of claim 1, characterized by an arrangement of one passive coil (26.1, 26.2) positioned beneath the active coil (18.1) and the distance of the each other course-turned trailing edges (23.1, 23.2) of the two short-circuit elements (23, 23.0) is limited the distance extending between the two short-circuit elements (23, 23.0) to the given stroke-height (h) defined end position (I, II) of the trailing one of the short-circuit elements (23, 23.0) and is enclosed by the active coil (18.1) and one of the two short-circuit element (23, 23.0) is at least partly covered by the at least one passive coil (26.1, 26.2).

6. The sensor arrangement according to claim 5, characterized by, the two passive coils (26.1, 26.2) being electrically connected one behind the other to form a quarter frequency carrier bridge (29).

7. The sensor arrangement according to claim 1, characterized by, at least the active coil (18.1) is purposefully mass unbalance wound.

8. The sensor arrangement according to claim 1, characterized by, the active coil (18.1) has an active coil length and the short-circuit element (23) has a short-circuit element length that is longer than the length of the active coil (18.1).

9. The sensor arrangement according to claim 1, characterized by, the active coil (18.1) has a length that is longer than a measurable for the stroke-height (h).

10. The sensor arrangement according to claim 1, characterized by, an inductivity of the active coil (18.1) is the sum of the inductivities of the passive coils (26.1, 26.2).

11. The sensor arrangement according to claim 1, characterized by, the short-circuit elements (23, 23.0) have a wall thickness that at least in part compensates for a temperature change influence on the sensor arrangement.

12. The sensor arrangement according to claim 1, characterized by the active coil (18.1) and the least a passive coils (26.1, 26.2) are connected in a half bridge and effect range of the sensor part of (17), such that the active coil receives the stroke-height (h) limiting end position (I, II).

13. The sensor arrangement according to claim 1, characterized by, the current supply and signal collector form a carry frequency measuring bridge (29), whereby the active coil (18.1) and the passive coils (26.1, 26.2) form a part of the measuring bridge (29) for the coil arrangement (18).

14. A procedure for the collection stroke data for a movable element, in particular a control member movable by an actuator, wherein by a field variable is established between two coils bounding stroke length, a short-circuit element on a rod-shaped sensor part in an active coil at the part moves between the two coils and induces a signal generation, the short-circuit element is bounded by a given stroke-height defined end position such that the short-circuit element has a range within the two coils and a trailing edge of the short-circuit element travels into a passive coil, and when another trailing edge of a short-circuit element crosses an end of the active coil a linear measuring signal is produced.

15. The procedure according to claim 14, characterized by on the rod-shaped sensor part is bound by two short-circuit element trailing edges that define the stroke-height wherein one of the trailing edges of a short-circuit element is enclosed by the active coil and a further edge one of the two short-circuit elements is at least partly covered by the passive coil.

* * * * *

UNITED STATES PATENT AND TRADEMARK OFFICE
CERTIFICATE OF CORRECTION

PATENT NO. : 7,420,362 B2
APPLICATION NO. : 10/573930
DATED : September 2, 2008
INVENTOR(S) : Gunter Gurich et al.

It is certified that error appears in the above-identified patent and that said Letters Patent is hereby corrected as shown below:

Title page Item - (22) replace "2005" with --2003--

Signed and Sealed this

Twenty-eighth Day of October, 2008

JON W. DUDAS
*Director of the United States Patent and Trademark Office*